July 9, 1968
T. E. MINER
3,391,841
PAPER ADVANCE MECHANISM
Filed Aug. 27, 1965
3 Sheets-Sheet 1
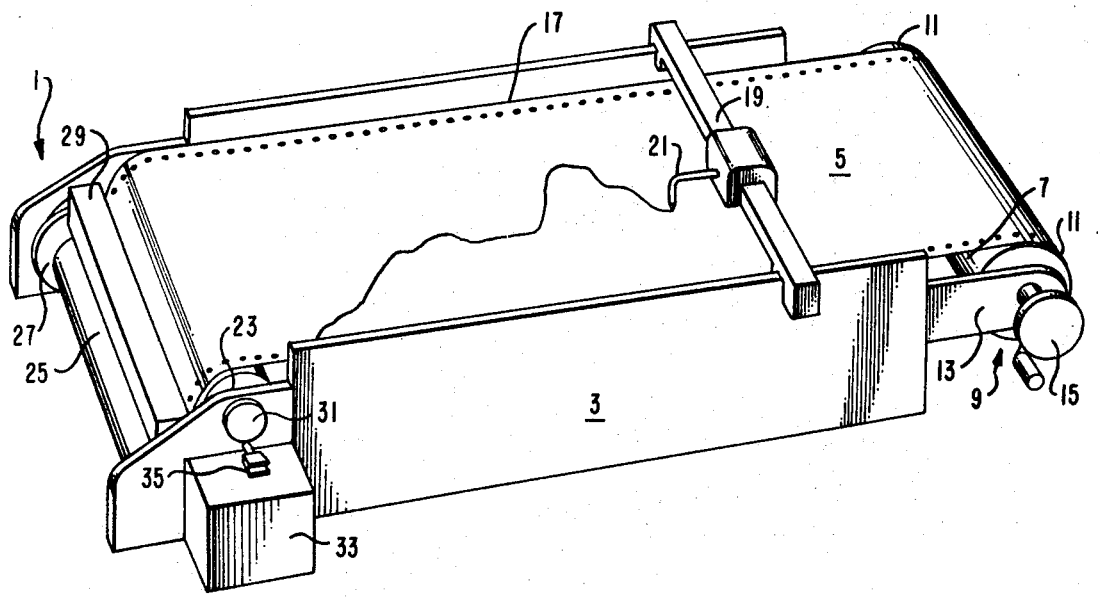
FIG.—1
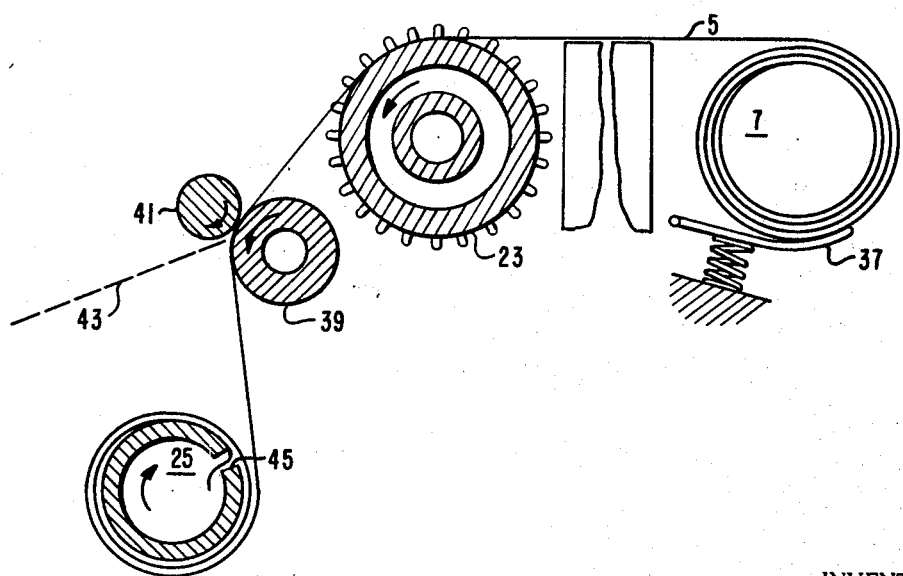
FIG.—2
INVENTOR.
THOMAS E. MINER
BY *Evans and Bogucki*
ATTORNEYS

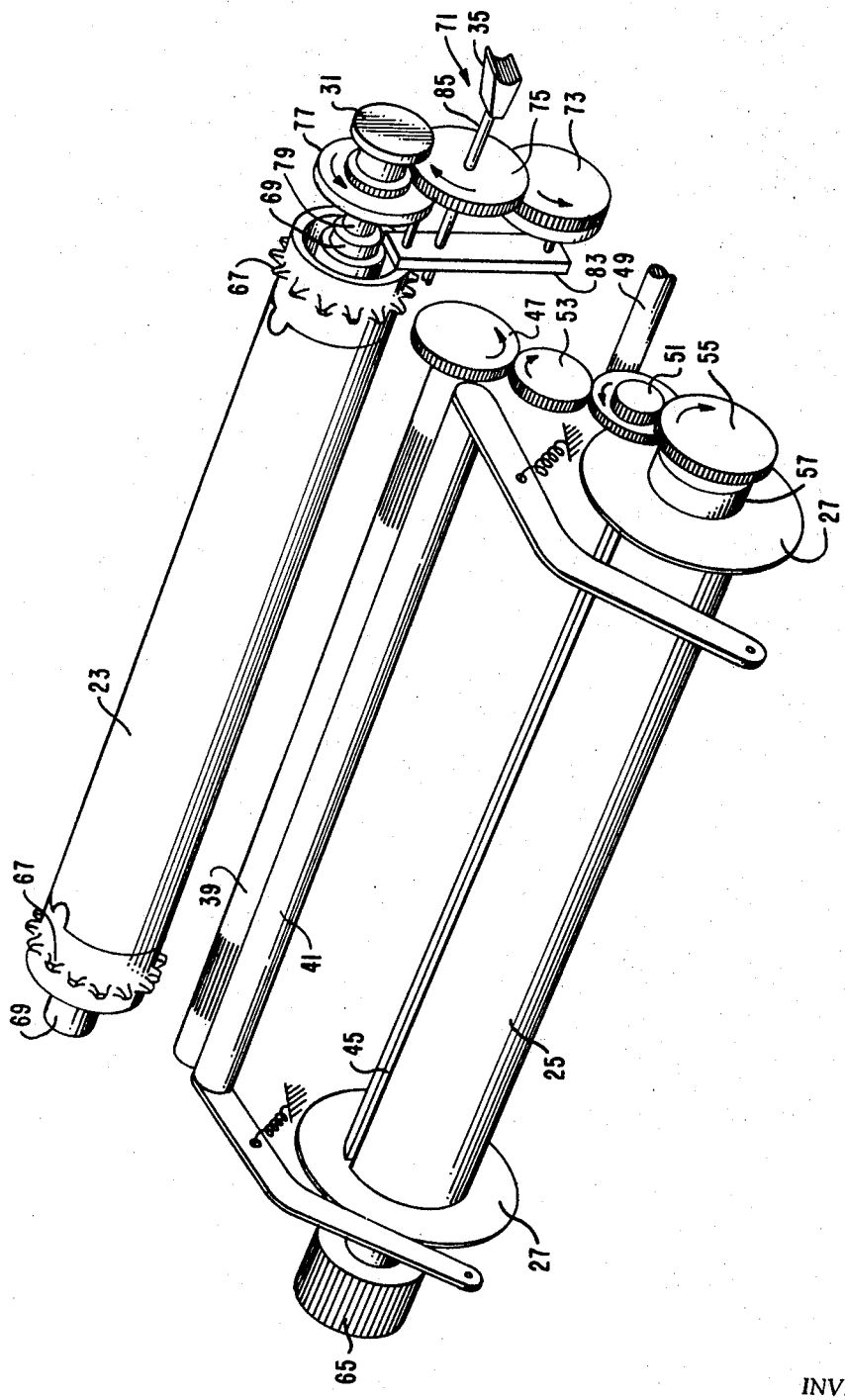

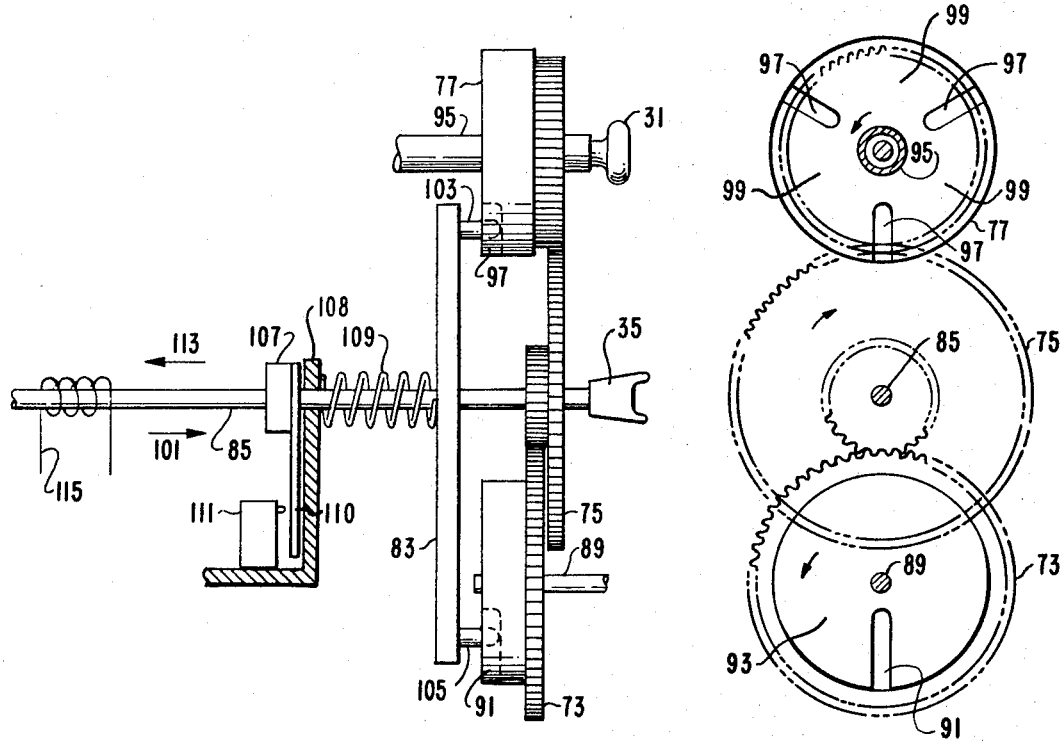
FIG.—4  FIG.—5
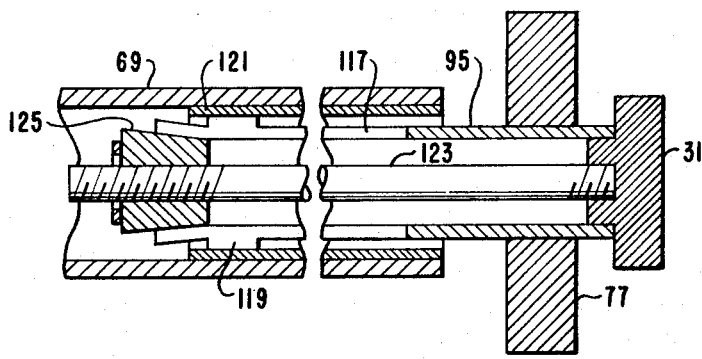
FIG.—6
INVENTOR.
THOMAS E. MINER
BY Fraser and Bogucki
ATTORNEYS

United States Patent Office 3,391,841
Patented July 9, 1968

3,391,841
PAPER ADVANCE MECHANISM
Thomas E. Miner, Pasadena, Calif., assignor to Hewlett-Packard Company, a corporation of California
Filed Aug. 27, 1965, Ser. No. 483,085
11 Claims. (Cl. 226—134)

ABSTRACT OF THE DISCLOSURE

A mechanism is provided which advances paper through an instrument in predetermined increments. Movement of a two-pronged pin by hand or by a remotely controlled solenoid energizes a drive mechanism to advance the paper while simultaneously unlocking the prongs from recesses in the movable elements of a paper metering mechanism. At the end of the desired increment of paper advance, the movable elements assume a particular orientation and the prongs lock into the recesses to stop paper advance and deenergize the drive mechanism.

---

This invention relates to paper advance mechanisms and more particularly to mechanisms for advancing paper through an instrument in predetermined increments.

Many different types of plotting recorders employ graph paper and a movable device for plotting information thereon. Such instruments vary in the configurations of the paper they use and also in the manner in which they position the paper. The present invention is particularly directed to so-called "X–Y" recorders which may record a succession of charts carried on a single strip of paper. Such paper is typically uniform in width and is wound into a roll for use. This roll is mounted on one part of the instrument and the paper is advanced through the recording part of the instrument as required.

It is often desirable when making a plurality of similar types of recordings that the paper be advanced after each recording so that a new "frame" of paper exactly the same size as the previous one is positioned within the recording part of the instrument for the next recording. It is particularly essential in the case where very accurate recordings are being made that a precise amount of paper be positioned in exactly the right location for each new recording. While advancement of the paper can be done by hand, it is preferable to advance the paper by a power driven mechanism which may be controlled from a remote location, if desired, and which automatically meters the paper during each advancement, always stopping it in precisely the proper position for the succeeding recording. Such a power driven mechanism permits automatic control of an X–Y graphical recorder and advantageously eliminates the need for an operator to remain in attendance to change charts during the recording process.

It is therefore a general object of the present invention to provide an improved paper advance mechanism for an X–Y recorder.

It is a more specific object of the present invention to provide a paper advance mechanism for an X–Y recorder which can be controlled from a remote location.

It is a further object of the present invention to provide a paper advance mechanism for stopping a strip of paper at a precise point after a predetermined increment of paper has been advanced.

In brief, particular arrangements in accordance with the invention may comprise a paper advance mechanism mounted on a recording instrument to meter the paper being advanced and to stop the paper when a predetermined amount has been run through the mechanism.

The mechanism contains various rotatable cylindrical members for pulling the paper through the instrument and storing it. In accordance with an aspect of the invention the mechanism has a rotatable metering drum which may be sprocketed to engage the paper to maintain accurate registration therewith. As the paper is pulled through the instrument, the drum is free to rotate through a predetermined number of revolutions. When the drum has completed the revolutions, it is stopped causing the paper which is sprocketed thereto to also stop. As the paper is stopped, the advance mechanism is de-energized and the metering drum locks the paper in position until the next advance cycle is initiated. When the paper advance mechanism is again actuated by the operator (or by remote control) for the next advancement, the drum is permitted to rotate the same predetermined number of revolutions allowing the paper to be advanced the same distance before it is again stopped.

In accordance with an aspect of the invention, the chart advance mechanism is controlled by a pin or plunger which, when released, both unlocks the metering drum and simultaneously activates the chart drive motor. The pin is maintained in the release position until the next chart frame has advanced into position on the recorder, as detected by the metering drum which monitors the advance of the chart paper. At that point the pin is permitted to drop into a recess in a locking cam which is rigidly coupled to the metering drum. This locks the metering drum from further movement, thus stopping the paper in the desired position, and simultaneously de-energizes the motor circuit so that the paper can be held in that position. When the paper is held stationary, the inertia of the motor and drive train is absorbed by slippage between the paper and an associated drive roller.

In accordance with the invention, the locking pin is arranged for manual control by depressing an "Advance" button on the front of the chart advance mechanism or alternatively is released by actuation of an associated solenoid from a remote location. With either control, the locking pin simultaneously controls the freedom of the metering drum to rotate and also controls the drive circuit for the motor.

In one particular arrangement in accordance with the invention, rotation of the metering drum is controlled by two rotatable cam members which are geared to each other and to the drum. When the metering drum rotates, these members are driven at varying rotational velocities. Each is equipped with cam surfaces having recesses therein. The locking pin is formed with two prongs which bear upon the respective surfaces and engage a recess in each member when the recesses are in the proper positions relative to the locking pin prongs. In this arrangement the number and spacing of the recesses in the cams and the ratios of the gearing between the cam members are selected such that a plurality of predetermnied increments of advance of the chart paper is provided so that, if desired, different sizes of charts may be used on the same recorder simply by replacing one or both of the cam members with others arranged to provide therefor.

In accordance with another aspect of the invention the advance mechanism is provided with a "zero" adjustment to determine initially the desired registration of the chart paper. This may be in the form of an element which releasably locks the metering drum to its associated output shaft (the position of which is normally locked by the locking pin). In one embodiment the zero adjust element comprises a slotted partial shaft which may be spread to engage the interior of the drum or released therefrom by an enclosed threaded member extending to a zero adjust knob on the front panel. The drum is temporarily released by this element when it is desired to adjust the position of the chart paper relative to the locking mechanism, as when a new roll of paper is first placed on the drum, for example. Once the paper is properly positioned (zeroed), the zero adjust element is set to again engage the drum for positive control thereof by the advance mechanism.

In accordance with another aspect of the invention, the paper advance mechanism is arranged to drive the paper through the instrument positively and at a constant speed and to hold it in a taut position during operation. A rotating drive roller is mtaintained in contact with the paper in order to advance the paper through the instrument, after which the paper is then stored on a rotating take-up roll. The take-up roll and drive roller are connected through a slip clutch and a series of interconnected gears which are motor driven. These motor driven gears continue to rotate the drive roller and the take-up roll so long as the paper is advancing and the paper is kept taut by having the take-up roll tend to rotate slightly faster than the drive roller. The slip clutch accommodates the difference in speeds so that the take-up roll may wind only as fast as paper is supplied to it by the drive roller, thus maintaining the paper taut without overdriving.

The novel features of this invention, as well as the invention itself, both as to its organization and method of operation, may best be understood when considered in the light of the following description, taken in connection with the accompanying drawings, in which:

FIG. 1 is a perspective view of a typical X—Y recorder equipped with a paper advance mechanism in accordance with the invention;

FIG. 2 is a partial section of the paper advance mechanism of FIG. 1 showing the various cylindrical members for advancing and storing the paper;

FIG. 3 is a perspective view of the cylindrical members of FIG. 2 with a particular locking pin assembly and zero adjust element installed;

FIG. 4 is a side elevation of the locking pin assembly of FIG. 3;

FIG. 5 is an end view of the various cam members of the locking pin assembly of FIGS. 3 and 4; and FIG. 6 is a side sectional view showing details of the zero adjust element in its engaged position within the metering drum.

Referring to FIG. 1 a chart advance mechanism 1 is shown operatively affixed to a recorder 3. The recorder 3 has a roll of graph paper 5 which is stored on a supply roll 7 of a paper supply mechanism 9 affixed to an end of the recorder 3 as shown. The roll of graph paper 5 is contained on the supply roll 7 by hubs 11, and the supply roll 7 is rotatably supported by support brackets 13. A drive knob 15 is connected to the supply roll 7 for initially rolling the graph paper 5 onto the supply roll 7, and for rewinding the graph paper if necessary. The recorder 3 has a platen 17 which serves to support a chart frame of the graph paper 5. The recorder 3 further has a pen beam 19 which is operative to move along the platen 17 as the recording is being made and a pen 21 which is operative to move along the length of the pen beam 19 during the recording.

The graph paper 5 is advanced on command across the platen 17 of the recorder 3 by the chart advance mechanism 1. The paper is pulled over a metering drum 23 having sprocket teeth to engage sprocket holes in the paper, and is stored on a take-up roll 25 which contains the paper between a pair of hubs 27. A pressure roll cover assembly 29 bears against the paper and serves to hold it in engagement with a driving member within the mechanism. A zero adjust knob 31 serves to temporarily disengage the metering drum 23 from the locking pin assembly (FIG. 3) so that the paper can be moved by hand or by the drive knob 15 for zero adjustment. A motor cover 33 encloses the motor and various elements of the chart advance mechanism 1. An advance button 35 coupled to the locking pin assembly releases the metering drum and energizes the chart advance mechanism 1 for advancement of another increment of paper when pushed by the operator.

The details of the various rotatable cylindrical members of the chart advance mechanism along with some of their associated parts can be understood with reference to FIGS. 2 and 3. FIG. 2 shows an end section of some of the cylindrical members while FIG. 3 shows them in perspective along with some of the associated parts. As shown in FIG. 2, the supply roll 7 is equipped with a spring loaded drag device 37 which bears upon the graph paper stored on the supply roll 7 and serves to keep it taut. That part of the graph paper which has been pulled through the recorder 3 is sprocketed to the metering drum 23, pulled through a drive shaft or roller 39 and a pressure roller 41, and wound upon the take-up roll 25. The end of the graph paper is inserted into a paper slot 45 which runs along the length of the take-up roll 25. The pressure roller 41 is rotatably mounted within the pressure roll cover assembly 29 shown in FIG. 1. In most instances of operation the graph paper 5 will be stored on the take-up roll 25; however, the graph paper need not be stored but can be simply inserted through the pressure roller 41 and the drive shaft 39. In this event the graph paper 5 follows a path shown by the dashed line 43.

As shown in FIG. 3 the drive shaft 39 has a drive shaft gear 47 affixed thereto which is driven by a motor shaft via gears 51 and 53. The gear 51 is also geared to a take-up roll gear 55 which is connected to a slip clutch 57 mounted on the end of the take-up roll 25. The ratios of these gears are chosen so that the take-up roll 25 tends to move the paper slightly faster than it is supplied by the drive shaft 39. This feature ensures that the paper is always kept taut throughout the extent of its traverse between supply and take-up rolls and is provided by the slip clutch 57 which allows the take-up roll 25 to rotate at a different rate than the take-up roll gear 55.

The metering drum 23 has sprockets 67 which engage perforations of the graph paper 5 and thereby cause the metering drum 23 to rotate in accordance with the amount of paper advanced. The metering drum 23 is mounted on a hollow metering shaft 69. Because of the sprocketed engagement of the paper to the metering drum 23, errors which might otherwise result from changes in the size of the paper through such things as temperature and humidity change or stretching are eliminated. The prongs on the sprockets 67 fit into the paper perforations with enough tolerance to accept slight variations in dimension of the paper.

A locking pin assembly 71 is shown coupled to one end of the metering drum 23 and serves to determine the increments of advancement of the graph paper by permitting the metering drum 23 to rotate only a predetermined number of revolutions in each advance cycle. The locking pin assembly 71 has a cycle gear 73 positively coupled to a metering shaft gear 77 through an idler gear 75. A zero adjust element 79 fits within the hollow metering shaft 69, and is disengageable from or engageable with the metering shaft 69 by means of the zero adjust knob 31. A pronged plunger 83 is mounted on a locking pin shaft 85 extending through the idler gear 75 to the advance button 35. The locking pin assembly 71 is locked in position between operating cycles of the advance mechanism and thus holds the metering drum 23 fixed in position.

The details of the locking pin assembly 71 of FIG. 3 can be better understood with reference to FIGS. 4 and 5. Both the cycle gear 73 and the metering shaft gear 77 present substantially flat cam surfaces 93 and 99 interspersed with recesses 91 and 97 respectively for engaging the prongs 105 and 103 of the plunger 83. A single advance recess 91 is present in the surface 93 of the cycle gear 73 while the metering shaft gear 77 has three fraction recesses 97 which are radially equidistantly located on one side. The presence of the three fraction recesses 97 results in three fraction camming surfaces 99 which are radially positioned and equidistantly spaced on that side.

The locking pin shaft 85 is mounted so that it is slidable axially in the alternate directions shown by arrows 101 and 113 but it cannot be twisted or rotated. The plunger 83 is fixedly mounted on the locking pin shaft 85 and has a fraction pin or prong 103 for engagement with the metering shaft gear 77 and an advance pin or prong 105 for engagement with the cycle gear 73. A tripping block 107 is affixed on the plunger shaft 85 on the inner side of a frame element 108 and a plunger spring 109. The tripping block 107 is equipped with an actuator 110 which contacts a plurality of microswitches 111 when the actuator 110 is moved in the direction of the arrow 113. When the actuator 110 contacts the microswitches 111, a further axial movement of the locking pin shaft in the direction of the arrow 113 results in compression of the plunger spring 109 against the frame 108. The locking pin shaft 85 can be moved axially in the direction of the arrow 113 either by the energization of a solenoid 115 (providing for control from a remote location) or by the manual pushing of the advance button 35.

In operation, the metering shaft gear 77 rotates 6⅓ revolutions for each revolution of the cycle gear 73. When the advance button 35 is pushed by the operator, the locking pin shaft 85 moves axially in the direction of the arrow 113. The fraction pin 103 and the advance pin 105 are pulled out of their respective recesses with the movement of the plunger 83. At the same time the actuation of the microswitches 111 energizes the motor resulting in the graph paper being advanced by the drive shaft 39 and stored on the take-up roll 25. The metering drum 23 rotates with the movement of the paper causing the metering shaft gear 77, the idler gear 75 and cycle gear 73 to rotate accordingly. The compressed plunger spring 109 causes the fraction pin 103 to bear upon the various fraction camming surfaces 99 of the metering shaft gear 77 and the advance pin 105 to bear on the advance camming surface 93 of the cycle gear 73. Since the plunger 83 is fixedly mounted to the locking pin shaft 85, the fraction pin 103 and the advance pin 105 cannot re-engage any of the recesses in the metering shaft gear 77 or the cycle gear 73, respectively, until the two gears are both capable of being engaged simultaneously. Therefore, the pins will not become re-engaged until the cycle gear 73 has made a complete revolution and the metering shaft gear 77 has made 6⅓ revolutions. When the recess 91 and a recess 97 are exactly aligned with the corresopnding pins 105 and 103, the plunger moves forward, engaging the recesses 91, 97 and positively locking the metering drum and paper from further movement. This action also releases the microswitches 111, deenergizing the motor. The slip clutch 57 (FIG. 3) permits slippage between the take-up roll and the drive train so that the paper is held taut and also to absorb the inertial rotation of the motor when the metering drum stops abruptly in the locked position.

While the metering shaft gear 77 has been disclosed as having three fraction recesses 97, such gear can have any number of fraction recesses if proper gear ratios are chosen. For example, if the metering shaft gear 77 rotated 10⅕ times for each single revolution of the cycle gear 73, the metering shaft gear would appropriately have 5 fraction recesses. Nor is the cycle gear 73 limited to a single recess, since the gear ratios can be chosen so that both gears make more than a single revolution before the recesses are aligned to engage the locking plunger.

The details of the zero adjust element 79 are shown in FIG. 6 and include a zero adjust collet 95 which extends through the metering shaft gear 77 and extends into the end of the hollow metering drum shaft 69. The inner end of the zero adjust collet 95 has a number of slots 117 along part of the length of the collet and a knurled portion 119. A layer of friction material 121 is fastened to the inside of the metering drum shaft 69. A zero adjust screw 123 is positioned within the collet 95 with one end affixed to the zero adjust knob 31. A wedge 125 is threaded on the other end of the zero adjust screw 123 and has a portion inserted within the collet 95. By turning the zero adjust knob 31 in the appropriate direction, the slotted end of the collet 95 is caused to expand or contract resulting in engagement to or disengagement from the metering shaft 69 respectively. This enables the operator to move the metering drum 23 and zero the paper while the locking pin assembly 71 is in its locked, inoperative position.

Although there has been described a specific arrangement of a paper advance mechanism in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be part of the invention.

What is claimed is:

1. A paper advance mechanism for use with a stationary bed chart recorder comprising a paper drive mechanism operable intermittently, means for locking the paper in position, means for releasing said locking means and simultaneously energizing the paper drive mechanism to initiate a paper advance cycle, and means for metering the amount of paper passing through the recorder and for actuating the locking means when a predetermined amount of paper has been advanced, said metering means including at least two locking recesses and said locking means including a pair of locking pin prongs operable to engage the locking recesses at a particular position of the metering means, the actuation of said locking means simultaneously de-energizing the paper drive mechanism.

2. A paper advance mechanism in accordance with claim 1 wherein said locking recesses are contained within separate elements which rotate at different angular velocities as the paper is advanced.

3. A paper advance mechanism in accordance with claim 2 wherein the releasing means comprises a manually operated element operable to disengage the prongs from the recesses.

4. A paper advance mechanism in accordance with claim 2 wherein the releasing means comprises a solenoid having an armature connected to retract the locking prongs from the recesses and means for selectively energizing the solenoid.

5. A paper advance mechanism in accordance with claim 2 further including at least one switch for energizing the paper drive mechanism and wherein the locking means comprises an actuator attached to the locking pin prongs for closing the switch when the locking pin prongs are in the released position and for opening the switch when the locking pin prongs are in the engaged position.

6. A paper advance mechanism for use with a stationary bed chart recorder comprising a paper drive mechanism operable intermittently, means for locking the paper in position, means for releasing said locking means and simultaneously energizing the paper drive mechanism to initiate a paper advance cycle, and means for metering the amount of paper passing through the recorder and for actuating the locking means when a predetermined amount of paper has been advanced, said means for metering including a first movable member having a locking recess and a second movable member having a plurality of locking recesses, and said means for locking including a pin having a pair of prongs for simultaneous engagement with locking recesses of the first and second movable members when both movable members assume a particular orientation.

7. A paper advance mechaninsm for use with a stationary bed chart recorder comprising a paper drive mechanism operable intermittently, means including a plunger having two prongs for locking the paper in position, means for releasing said locking means and simultaneously energizing the paper drive mechanism to initiate a paper advance cycle, means for metering the amount of paper passing through the recorder and for actuating the locking means when a predetermined amount of paper has been advanced including a pair of geared cam members each having at least one recess adapted to receive a corresponding one of said prongs, and means for driving the cam members at varying rates of rotation so that the recesses are aligned to engage both of the associated prongs simultaneously only when a predetermined amount of paper has been advanced by the drive mechanism.

8. A paper advance mechanism in accordance with claim 7 wherein a first one of said cam members is provided with a single recess and the second of said cam members is provided with three recesses substantially equally spaced about the periphery of the cam member and said cam members are geared together to provide a rotation by said second cam member of six and one-third revolutions for one revolution of said first cam member.

9. A paper advance mechanism for moving paper through an instrument in predetermined increments comprising means for pulling the paper through the instrument, first rotatable means capable of being engaged upon equal increments of rotation, second rotatable means operatively connected to the first rotatable means and capable of being engaged upon equal increments of rotation which are different from the increments of rotation of the first rotatable means, means positively coupling the paper to the first and second rotatable means, and means for engaging the first and second rotatable means when both are aligned for engagement simultaneously to block further rotation of the rotatable means and further movement of the paper through the instrument.

10. A paper advance mechanism for moving paper through an instrument in predetermined increments comprising means for pulling the paper through the instrument, first rotatable means capable of being engaged at equal intervals of rotation, second rotatable means synchronously coupled to the first rotatable means and capable of being engaged at equal intervals of rotation which are different from the intervals of the first rotatable means, metering means geared to the paper and connected to drive the rotatable means in accordance with the amount of paper pulled through the instrument, means for engaging the first and second rotatable means simultaneously when both said means are aligned for engagement, and means for temporarily disconnecting the first and second rotatable means from the metering means.

11. A paper advance mechanism for use with a stationary bed chart recorder comprising a paper drive mechanism operable intermittently, means for locking the paper in position, means for releasing said locking means and simultaneously energizing the paper drive mechanism to initiate a paper advance cycle, means for metering the amount of paper passing through the recorder and for actuating the locking means when a predetermined amount of paper has been advanced, and releasable coupling means between the locking means and the metering means to permit manual adjustment of the position of the paper while the locking means is in the locked position, said releasable coupling means comprising a threaded element, a wedge member for threading onto said element and a slotted expandable member positioned within the metering device for gripping the interior of the metering device when the wedge member is threaded onto the slotted member to expand said member.

References Cited
UNITED STATES PATENTS

| | | | |
|---|---|---|---|
| 1,976,775 | 10/1934 | Frederick | 226—144 |
| 2,723,116 | 11/1955 | Abbott. | |
| 2,933,931 | 4/1960 | Lisinski. | |

M. HENSON WOOD, Jr., *Primary Examiner.*

R. A. SCHACHER, *Assistant Examiner.*